United States Patent
Mtibaa et al.

(10) Patent No.: US 9,806,999 B2
(45) Date of Patent: Oct. 31, 2017

(54) METHOD TO MANAGE AN OPPORTUNISTIC COMMUNICATION NETWORK

(75) Inventors: Abderrahmen Mtibaa, Paris (FR); Martin May, Paris (FR); Christophe Diot, Paris (FR)

(73) Assignee: Thomson Licensing, Issy-les-Moulineaux (FR)

( * ) Notice: Subject to any disclaimer, the term of this patent is extended or adjusted under 35 U.S.C. 154(b) by 778 days.

(21) Appl. No.: 13/517,459

(22) PCT Filed: Dec. 17, 2010

(86) PCT No.: PCT/EP2010/070159
§ 371 (c)(1),
(2), (4) Date: Jun. 20, 2012

(87) PCT Pub. No.: WO2011/076700
PCT Pub. Date: Jun. 30, 2011

(65) Prior Publication Data
US 2012/0271933 A1 Oct. 25, 2012

(30) Foreign Application Priority Data
Dec. 21, 2009 (EP) .................................. 09306295

(51) Int. Cl.
*G06F 13/00* (2006.01)
*H04L 12/721* (2013.01)
(Continued)

(52) U.S. Cl.
CPC .............. *H04L 45/44* (2013.01); *H04L 41/12* (2013.01); *H04L 45/00* (2013.01); *H04L 45/124* (2013.01);
(Continued)

(58) Field of Classification Search
CPC ... H04L 12/5855; H04L 12/588; H04L 45/00; H04L 45/308; H04L 45/124; H04L 51/32; H04L 51/14; H04L 45/44; H04L 41/12
(Continued)

(56) References Cited

U.S. PATENT DOCUMENTS

| | | | |
|---|---|---|---|
| 8,359,276 B2 * | 1/2013 | Zhuang et al. | 705/319 |
| 2004/0155903 A1 * | 8/2004 | Schneeberg | 345/765 |

(Continued)

FOREIGN PATENT DOCUMENTS

| | | |
|---|---|---|
| EP | 1841178 | 10/2007 |
| WO | WO03058868 | 7/2003 |

OTHER PUBLICATIONS

Daly etal: "Social Network Analysis for Routing in Disconnected Delay-Tolerant MANETs", Proceedings of the 8th Symposium on Mobile AD HOC Networking. Sep. 9, 2007,pp. 32-40.
(Continued)

*Primary Examiner* — Kenneth R Coulter
(74) *Attorney, Agent, or Firm* — Myers Wolin LLC

(57) ABSTRACT

This relates to message propagation in an opportunistic communication network. Nodes of the network each have a ranking which is compared when the nodes connect, and message is transferred from one node to the other in dependence on the relative values of their respective rankings. The ranking is dependent on a plurality of parameters. One parameter is a social parameter determined by the social contacts of a user associate with a node, for example determined from the contact directory of that person either locally or from a central database such that located on a Face book servicer. Another parameter is the number of physical connections established by a node. The ranking values of
(Continued)

Figure 1:
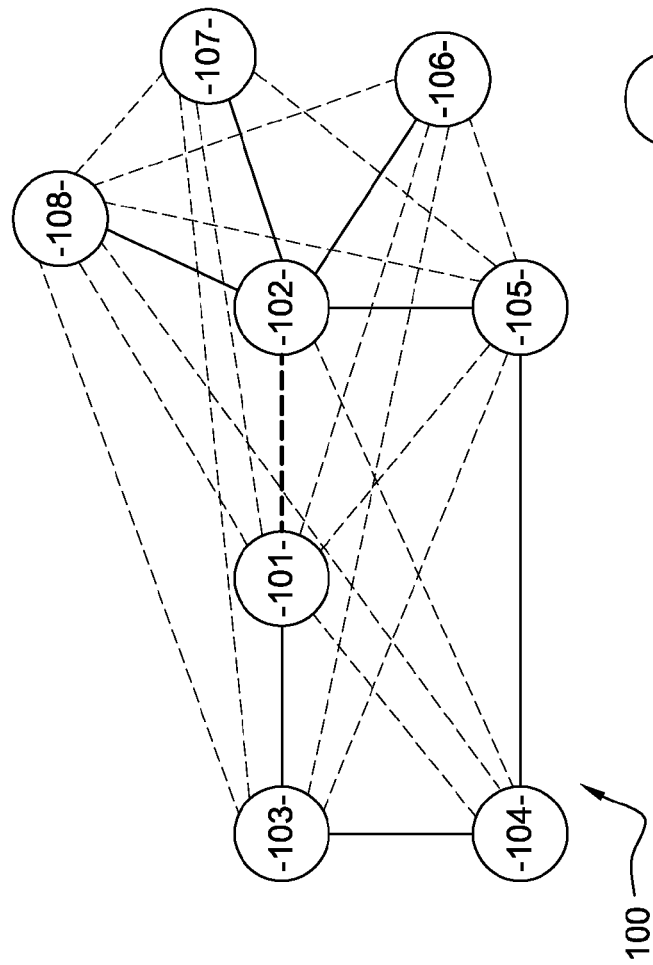

connecting nodes is updated when they connect. By combining both parameters, a more efficient forwarding path for messages is obtained.

20 Claims, 1 Drawing Sheet

(51) Int. Cl.
H04L 12/24 (2006.01)
H04L 12/701 (2013.01)
H04L 12/725 (2013.01)
H04L 12/58 (2006.01)

(52) U.S. Cl.
CPC .......... *H04L 45/308* (2013.01); *H04L 51/14* (2013.01); *H04L 51/32* (2013.01)

(58) Field of Classification Search
USPC .................. 709/206, 207, 238, 240, 241; 715/751–759
See application file for complete search history.

(56) References Cited

U.S. PATENT DOCUMENTS

| | | | |
|---|---|---|---|
| 2005/0086260 A1 | 4/2005 | Canright et al. | |
| 2005/0256887 A1 | 11/2005 | Eiron et al. | |
| 2007/0280006 A1 | 12/2007 | Aoyama et al. | |
| 2008/0070209 A1* | 3/2008 | Zhuang et al. | 434/236 |
| 2008/0075014 A1 | 3/2008 | Jiang | |
| 2008/0313125 A1 | 12/2008 | Galvin et al. | |
| 2012/0150957 A1* | 6/2012 | Bonchi | 709/204 |
| 2013/0311563 A1* | 11/2013 | Huberman et al. | 709/204 |

OTHER PUBLICATIONS

Mtibaa etal: "Are You Moved by Your Social Network Application?", Proceedings of the First Workshop on Online Social Networks, Aug. 18, 2008, pp. 67-72.

Pietilainen etal: "MobiClique: Middleware for Mobile social Networking" Proceedings of the 2nd ACM Workshop on Online Soclal Networks, Aug. 17, 2009, pp. 49-54.

Search Report Dated Feb. 4, 2011.

Ghedira et al—"SBRM: score-based routing mechanism for vehicle ad hoc network"—2008 5th IEEE International Conference on Mobile Ad Hoc and Sensor Systems (MASS), 718-723. IEEE, Piscataway, NJ, USA—Sep. 29, 2008-Oct. 2, 2008—pp. 718-723.

He et al—"Clustering of network link characteristic for detector placement of macroscopical prewarning"—First International on Computer and Computational Sciences, IEEE—Jun. 20-24, 2006.

Kashiwazaki et al—"Multiagents-based adaptive network routing algorithm"—6th World Multiconference on Systemics, Cybernetics and Informatics. Proceedings, Jul. 14-18, 2002, Orlando, FL, USA.

Nan et al—"Evaluate nodes importance in the network using data field theory"—2007 International Conference on Convergence Information Technology—ICCIT '07, pp. 1225-1230. IEEE—Nov. 21-23, 2007

* cited by examiner

METHOD TO MANAGE AN OPPORTUNISTIC COMMUNICATION NETWORK

This application claims the benefit, under 35 U.S.C. §365 of International Application PCT/EP2010/070159, filed Dec. 17, 2010, which was published in accordance with PCT Article 21(2) on Jun. 30, 2011 in English and which claims the benefit of European patent application No. 09306295.8, filed Dec. 21, 2009.

FIELD OF THE INVENTION

The invention relates to a method for managing an opportunistic communication network.

THE PRIOR ART

The emergence of a new generation of communication devices leads to considering opportunistic networks, wherein end-to-end connectivity between devices is performed using multi-hop data transfer over intermediate devices when they are temporarily connected.

To forward messages in such opportunistic networks, a device has to decide to which other device the message should be sent in order to reduce the cost (number of message replicas) of delivery while maximizing the transmission success rate. In one extreme, a device may broadcast—i.e. transmit a copy—a message to all devices with which it enters into contact; in another extreme, the message is forwarded to its destination only where the destination is met.

In said opportunistic networks, an addressing terminal having to send a message has to decide whether or not to forward such message to encountered terminals which might behave as intermediate in the path towards the addressed terminal.

Such forwarding decisions are typically guided by the desire to reduce the number of replicas of the message in the network—to conserve bandwidth—as well as by the desire to reduce end-to-end delay of transmission As guidelines to take forwarding decisions, it is known to consider a register of the previous contacts established by the transmitting terminal or information about device mobility patterns.

It is also known to consider social parameters whereby the social network of terminal users is taken into account, most of these contributions imposing a centralized computation of social properties such as centrality.

THE PROBLEM

Social interaction as a sole means to guide forwarding decision, as in the prior art, does not provide satisfactory indications for taking forwarding decision. Moreover a centralized computation is not satisfactory for implementing the invention in an opportunistic network since centralized architectures are in general of limited scalability. Indeed all data/information has to be transported and processed in a centralized entity which causes additional delay and increased overhead.

THE INVENTION

The object of the invention is to provide a method for managing an opportunistic data communication network with increased performances as compared to a purely social opportunistic data communication network. Further, the invention aims to deliver a method which can be implemented in a distributed manner inside an opportunistic network.

The invention results from the intuition that some correlation exists between social contacts of terminal users and communication connections between said users' terminals.

For instance, it can be expected that the more two users are socially connected, the more chances would have their terminals to establish a connection. As another example, it can be expected that the terminal of a well socially connected user would have a terminal experiencing a wide variety of opportunistic contacts so that said social user is more suited to forward messages towards any given destination than a less important user.

Therefore, one aspect of the present invention relates to a method as specified in claim 1.

As compared to the known forwarding algorithm solely based on social or terminal contact information, the invention achieves better results since it combines relatively stable parameters—the contacts in a social network—with the connection information of the opportunistic network.

As a result, the invention can improve data transmission in an opportunistic network. For instance, it has been observed that the invention can reduce the transmission cost (the number of message copies retransmitted) by a factor of two while still delivering 95% of all messages as compared to flooding.

Moreover, the invention is a fully decentralized method which only requires exchanging small local social information between terminals in order to update ranking values as described thereafter.

It should be underlined that such combination of social and connecting networks information is not obvious since these two sources of information rely on different characteristics i.e. either the social behavior of a user or the connecting behavior of a terminal.

Nevertheless, it appears feasible to combine parameters which are significant of said social behavior or connecting behavior so that the ranking of a node represents, or identifies, said social behavior and said connecting behavior, providing thereby an improved parameter to decide on whether or not forwarding a message.

In one embodiment, the invention further comprises the step for terminals to exchange and store their respective ranking values when they establish a connection.

In one embodiment, the invention further comprises the step of ranking a terminal according to a formula such as:

$$RV(i) = (1-d) + d \sum_{N(j) \in F(Ni)} \left( f(i,j) * \frac{RV(j)}{|F(Nj)|} \right)$$

Wherein RV(i) is the ranking value of a terminal i, d is a constant, f(i,j) is a parameter relating to the frequency of contacts established by terminal i and F(Nj) is the set of the neighboring nodes connected to the terminal.

In one embodiment, f(i,j) is increased when the terminal i establishes a connection through a formula such as:

$$f(i,j) = \frac{\pi(i,j)}{\sum_{j \in F(i)} \pi(i,j)}$$

Wherein π(i, j) denotes the number of times node i and node j have established a connection with each other.

In one embodiment, the constant value of d depends on the nature of the considered social network, in particular on whether such social network relates to: an explicit relationship, a connection established through a telecommunication network, a common interest.

In one embodiment, the social network and the communication network are modeled through respective social node graph and communication node graph in order to allow an estimation of the correlation between said homogenous node networks, d being increased when the correlation between said homogenous node networks increases according to a formula such as:

$$d=1-div(G(s),G(t))$$

Wherein G(s) represents the social node graph and G(t) represents the communication node graph.

In one embodiment, the correlation is estimated with a metric that measures the divergence between the social network graph and the communication network graph (100) through a formula such as:

$$div\ (G(s),\ G(t)) = \frac{|\{d(u,\ w\} \leq d(v,\ w)\ \text{and}\ \pi\ (u,\ w) < \pi\ (u,\ w)\}|}{|Vs|(|Vs|-1)}$$

Wherein d(u, w) denotes a distance between node u and node v in the social graph and π(u,w) denotes the number of times node u and node v are in contact with each other and Vs represents the set of nodes in the social graph.

According to another aspect of the invention, there is provided a terminal as specified in claim 9.

The term "terminal" a specified in claims 1 and 9 will be understood to include a node, or other device capable of forwarding or routing data. A terminal may be localized or formed as an end device and a node device, the node device being connected to the end device when in use, the node device serving to identify the end device. The respective rankings may be stored and/or compared at each end device, or may these may be stored and/or compared at an end device.

The invention also relates to an opportunistic communication network comprising a plurality of terminals, each of said terminals being able to transmit a message to an intermediate neighboring terminal when a connection is established with said intermediate neighboring terminal, wherein it comprises:
 means for identifying each terminal through a node ranked with a value derived from both a social parameter, based on established contacts of the terminal user in a social network, and a communication parameter, based on established connections of said terminal in the opportunistic network,
 means for having a transmitting terminal, establishing a connection with an intermediate neighboring terminal, comparing the rankings of their respective identifying nodes so that the message is transmitted to the intermediate neighboring terminal if the ranking value of the node identifying said intermediate neighboring terminal is higher than the ranking value of the node identifying the transmitting terminal in order to implement a method according to any of the previous embodiments.

The invention will preferably be implemented at least in part in software means, for example a computer-readable medium storing one or more sets of computer-executable logic elements or instructions. Yet another aspect of the invention relates to software means as specified in claim 8.

Figure 2:
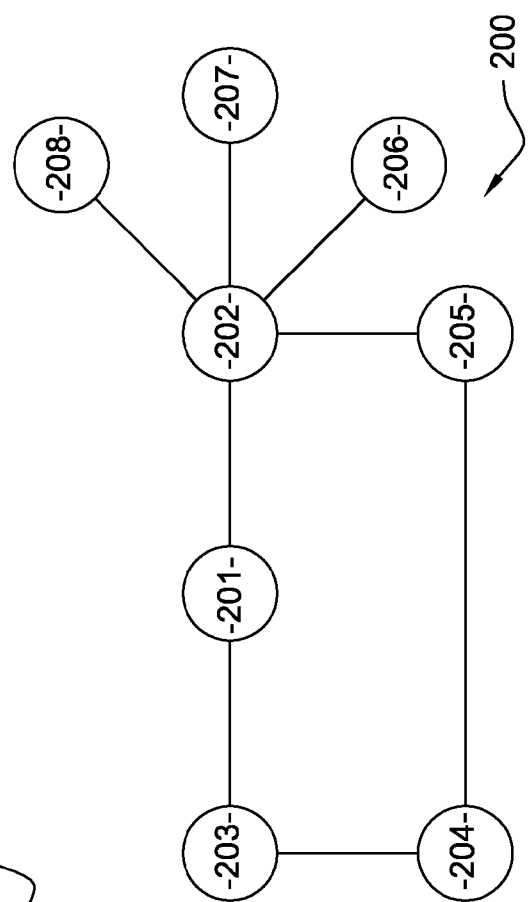

The invention will now be further described, by way of example only, and with reference to the following drawing in which:

FIG. 1 represents a connection graph of terminals within an opportunistic network implementing an embodiment of the invention, and FIG. 2 represents a social graph of the users of the terminals represented in FIG. 1 within the same embodiment of the invention.

Wherever possible, the same reference numerals will be used throughout the drawings to refer to the same or like parts.

In reference to FIG. 1, an example of an embodiment of the invention is described considering an opportunistic communication network 100 comprising a plurality of terminals 101, 102, . . . , 107, 108, each of said terminals being able to transmit a message to an intermediate neighboring terminal when a connection is established with said intermediate neighboring terminal.

Within said network 100, end-to-end connectivity between terminals—also referred to thereafter as "nodes" as they are identified and represented in network graphs—might be performed using multi-hop data transfers over intermediate nodes so that an addressing node has to decide whether or not to forward a message—i.e. a copy of said message—to an intermediate node.

For that purpose and accordingly to the invention, each node requests a ranking value of its neighboring nodes so that a transmitting node can decide to transmit a message to a neighboring node if said neighboring node ranking value is higher than its own ranking value.

Said ranking value is derived by each node from both a social parameter, based on the connections of its respective user—also represented by nodes 201, 202, . . . , 207 or 208 in a social network graph 200 of FIG. 2—and a communication parameter, based on the connections of said terminal in the opportunistic network.

In this embodiment, said derivation is performed through an equation such as:

$$RV\ (i) = (1-d)+d \sum_{N(j)\in F(Ni)} \left(f(i,\ j)*\frac{RV(j)}{|F(Nj)|}\right)$$

Wherein RV(i) is the ranking value of the terminal i, d is a constant, f(i,j) is a parameter relating to the frequency of contacts established by terminal i, F(Nj) is a number indicative of the set of the neighboring nodes connected to terminal i. That is, it is the number of social contacts associated with the terminal i. For example, the number of social contacts associated with a terminal could be the number of people the user of that terminal is associated with in a directory database, such as Facebook. In more detail, the number of social contacts may be the number of people listed as "friends" of the user in a central database such as Facebook. However, the number of social contacts may be the number of telephone numbers stored in the terminal of the user.

When implementing such equation to the situation depicted in FIGS. 1 and 2 through recursive computation, it appears that the ranking values tends toward a number considered as said ranking value. Considering that the frequency parameter f(i,j) is equal to 1 for all the nodes, it appears that a ranking value RV(3) of the node 3 tends to a value (0,28) which is inferior to the ranking value RV(1) of the node 1 (0.43). Thus, terminal 1 does not transmit its message to terminal 3 despite having a constant connection thereto.

At the opposite, it appears that the ranking value RV(1) of the node 1 is inferior to the ranking value RV(2)—tendency or convergence towards 0.66—of the node 2 so that the terminal 2 transmits the message to node 2 once a connection thereto is established.

Thus it appears that it could be optimal to weight the social relationship with the frequency of contact between two nodes so that, in the given example, node 1 transmits the message to node 3 which could forward said message to node 6 via intermediate nodes 4, 5 and 2.

For that purpose, f(i,j) is increased, when the terminal i establishes a connection with the terminal j, through a formula such as:

$$f(i, j) = \frac{\pi(i, j)}{\sum_{j \in F(i)} \pi(i, j)}$$

Wherein π(i, j) denotes the number of times node i and node j have established a connection with each other.

On the basis of such frequency parameter, the above given example results on a ranking value RV(3) of the node 3 superior to the ranking value RV(2) of the node 2, which remains superior to the ranking value RV(1) of the node 1. Thus, terminal 1 transmits its message to terminal 3 on its path towards terminal 6.

Implicitly, this method combines both social and contact behavior of respectively the terminal and its user to rank them through identifying nodes as described on the algorithm described herein below which implements the invention as follows:

```
Step 1:
    Require | F(i) |≥ 0
    RV(i) ->0,
Step 2:
    While i is in contact with j do
        Update (π(i,j))
Step 3:
    If j ∈ F(i) then
        Send (RV(i), | F(i) |)
        Receive ((RV(j), | F(j) |))
        Update (RV(i)).
Step 4:
    End if
    While ∃ m ∈buffer (i) do
        If RV(j) ≥RV (i) or j = destination (m) then
            Forward (m,j)
        End if
    End while
    End while
End while
```

As described in this algorithm, a terminal starts with a ranking value of 0 (step 1); whenever it meets a terminal j, they both update their contact counters (π(i;j)) (step 2). If the two nodes are also neighbors in the social graph, they then exchange their current rank values and the number of neighboring nodes in the social graph neighbors they have (step 3) since such parameters are used by each other to update their rank values using, for instance, the formula already described.

Thereafter, the terminals can compare their updated ranking value (step 4) so that, if the ranking value of the neighboring terminal j is superior to the ranking value of the terminal i, the latter transmits a copy of the message to forward to the terminal j.

The social graph of FIG. 2 shows that a node can be associated with one or more other nodes. Hence, the social graphs provides an indication of the social association, if any, between a given node and one or more other nodes.

It also appears from the previous example that the value of d, also called damping factor, differentiates the terminals 101, 102, . . . , 107 and 108 according to the social contacts of their respective users 201, 202, . . . , 207 or 208 so that the higher is d and the higher is such differentiation. Indeed, for d equal to 0, all nodes are used for sending a message with equal probability whereas for values close to 1, nodes with better social connections are preferred.

As a consequence, d can be set to a higher value when the considered social network provides a higher accuracy and/or reliability towards a social contact. For instance, d could be set to 1 for reliable social networks, but a lower value could be used if the contacts are based on implicit contacts detected from terminal telecommunications or declared interests which appear to be common.

Another method to set the d value is based on a model of the social network, respectively the communication network, through homogenous node graphs, as represented in FIGS. 1 and 2, so that characteristics of each graph can be compared. For instance, considering the transmission in a network comprising N mobile wireless terminals, the evolution of the contacts within the network can be modeled by a time varying graph G(t) defined by a function such as:

$$G(t)=(V,E(t))$$

Wherein V is the set of nodes in the communication graph (FIG. 1), N=|V| (N=8 in the above figure), and E(t) is the set of edges (connections between nodes).

It is assumed that the network is established at a time t0 and ends at time T (T can be infinite) so that, for each value of t, G(t) describes the connections between terminal/nodes 101, 102, . . . , 107 and 108 existing at time t which can be reported from a mobility/contact trace or from a mobility model along knowledge of radio properties.

As previously explained, data is typically stored in intermediate nodes awaiting appropriate contact information so that transmission paths are constructed as concatenation of contacts that are followed as they appear in the time varying graph.

Among these paths, a path from a starting node towards a destination node is delay-optimal if it reaches the destination d in the earliest possible time.

In order to tend towards such optimal transmission, the social graph Gs between the users 201, 202, . . . , 207 or 208 of the mobile terminal 101, 102, . . . , 107, 108 or can be denoted as:

$$G(s)=(Vs,Es)$$

Wherein Vs is the set of nodes in the social graph (FIG. 2) and E(s) is the set of edges (connections between nodes).

Thereafter it is assumed that the set of nodes V corresponds to a vector Vs so that all the users of the terminal are identified in the social graph through nodes Such social graph reflects the interactions between said users on the basis of information which can be retrieved from, for instance, explicit declarations of social link in social networks and/or implicit indicia as online applications, phone calls or other sources.

To summarize, a link in the social graph between two nodes implies that these nodes are socially "connected", e.g. "friends" in Facebook or sharing a common interest.

Since social network 200 and communication network 100 are represented through homogenous data—i.e. a graph of nodes—an estimation of the correlation between said homogenous node networks can be performed in order to increase the value of d when the correlation between said homogenous node networks increases.

Said increase can be achieved, for instance, through a formula such as:

$$d = 1 - div(G(s), G(t))$$

Wherein div(G(s),Gt)) is a measure, comprise between 0 and 1, of the divergence between said two homogenous graphs.

A metric measure of that divergence can be achieved through a formula such as:

$$div\ (G(s),\ G(t)) = \frac{|\{d(u, w) \leq d(v, w)\ \text{and}\ \pi\ (u, w) < \pi\ (u, w)\}|}{|Vs|(|Vs|-1)}$$

Wherein d(u, w) denotes a distance between node u and node v in the social graph and π(u,w) denotes the number of times node u and node v are in contact with each other.

Considering an example wherein such distance is the number of nodes between users of the social graph, it appears that neighboring nodes of a given node have a distance of 1 towards said given node whereas the nodes neighboring said neighboring nodes have a distance of two towards said given node. The invention can be implemented through different embodiments wherein, for instance, the nodes store the ranking of indirect neighboring nodes stored by their direct neighboring nodes.

In another embodiment, the summations can be replaced by integration in order to consider continuous time in the edge set variation of the contact graph.

In conclusion, at least some aspects of the above embodiments can be summarized as follows.

They relate to message propagation in an opportunistic communication network (100). Nodes of the network each have a ranking (RV) which is compared when the nodes connect, and message is transferred from one node to the other in dependence on the relative values of their respective rankings. The ranking is dependent on a plurality of parameters. One parameter is a social parameter determined by the social contacts of a user associate with a node, for example determined from the contact directory of that person either locally or from a central database such that located on a Face book servicer. Another parameter is the number of physical connections established by a node. The ranking values of connecting nodes is updated when they connect. By combining both parameters, a more efficient forwarding path for messages is obtained.

The invention claimed is:

1. A method comprising:
    establishing by a first terminal in a communication network associated with a first node in a social network, a connection with a second terminal of the communication network,
    checking, using processing circuitry, whether the second terminal is associated with a second node of the social network in social networking contact with the first node, and if so:
    transmitting, by the first terminal, a ranking value of the first terminal to the second terminal;
    receiving, by the first terminal, a ranking value of the second terminal;
    updating, by the first terminal, the ranking value of the first terminal based on the ranking value of the second terminal;
    the ranking value of the first terminal being taken into account, by the first terminal, in forwarding messages from the first terminal in the communication network.

2. The method according to claim 1 wherein said social networking contact relates to an explicit relationship or a common interest.

3. The method according to claim 1 further comprising obtaining, by the first terminal, a measure of correlation between the social network and the communication network, and weighting a contribution of the ranking value of the second terminal to the ranking value of the first terminal with said correlation, said contribution being higher when said correlation is stronger.

4. The method according to claim 3 wherein the measure of correlation is estimated with a metric that measures a divergence between a social network graph associated with the social network and a communication network graph associated with the communication network.

5. The method according to claim 1, wherein the network is an opportunistic network, wherein end-to-end connectivity between devices is performed using multi-hop data transfer over intermediate devices when they are temporarily connected.

6. The method according to claim 1, further comprising:
    comparing, by the first terminal, the ranking value of the second terminal with the ranking value of the first terminal; and
    transmitting a message by the first terminal to the second terminal, if the ranking value of said second terminal is higher than the ranking value of the first terminal or if the second terminal is an intended recipient of the message.

7. The method according to claim 6, wherein the ranking value of the first terminal compared with the ranking value of the second terminal is the updated ranking value of the first terminal.

8. The method according to claim 1, comprising:
    transmitting, by the first terminal, a number indicative of a set of social networking contacts of the first terminal;
    receiving, by the first terminal, a number indicative of a set of social networking contacts of the second terminal;
    weighting, by the first terminal, a contribution of the ranking value of the second terminal to the ranking value of the first terminal with said number indicative of said set of social networking contacts, said contribution being lower when said number is higher.

9. The method according to claim 1, comprising:
    updating, by the first terminal, a number of connections between the first terminal and the second terminal in the communication network;
    updating, by the first terminal, the ranking value of the first terminal based on said number of connections by weighting a contribution of the ranking value of the second terminal to the ranking value of the first terminal depending on said number of connections, said contribution being higher when said number is higher.

10. The method according to claim 1, wherein said updating is such that the ranking value of the first terminal is a linear function of the ranking value of the second terminal, said linear function having a strictly positive intercept.

11. A non-transitory computer readable medium with instructions stored therein which upon execution instruct at least one processor of a first terminal of a communication network associated with a first node in a social network, when a connection is established between the first terminal and a second terminal of the communication network, to:
- check, using processing circuitry, whether the second terminal is associated with a second node of the social network in social networking contact with the first node, and if so:
- transmit a ranking value of the first terminal to the second terminal;
- receive a ranking value of the second terminal;
- update the ranking value of the first terminal based on the ranking value of the second terminal;
- the ranking value of the first terminal being taken into account, by the first terminal, in forwarding messages from the first terminal in the communication network.

12. An opportunistic communication network, wherein end-to-end connectivity between devices is performed using multi-hop data transfer over intermediate devices when they are temporarily connected, said opportunistic communication network comprising a first terminal associated with a first node in a social network, the first terminal comprising:
- a processor;
- a memory having instructions which upon execution instruct the processor to:
- establish a connection between the first terminal and a second terminal;
- check, using processing circuitry, whether the second terminal is associated with a second node of the social network in social networking contact with the first node, and if so:
- transmit a ranking value of the first terminal to the second terminal;
- receive a ranking value of the second terminal;
- update the ranking value of the first terminal based on the ranking value of the second terminal;
- the ranking value of the first terminal being taken into account, by the first terminal, in forwarding messages from the first terminal in the opportunistic communication network.

13. A first terminal in a communication network, said first terminal being associated with a first node in a social network, comprising:
- a processor;
- a memory having instructions which upon execution when a connection is established between the first terminal and a second terminal of the communication network, instruct the processor to:
- check, using processing circuitry, whether the second terminal is associated with a second node of the social network in social networking contact with the first node, and if so:
- transmit a ranking value of the first terminal to the second terminal;
- receive a ranking value of the second terminal;
- update the ranking value of the first terminal based on the ranking value of the second terminal;
- the ranking value of the first terminal being taken into account, by the first terminal, in forwarding messages from the first terminal in the communication network.

14. The first terminal according to claim 13, wherein the instructions, when executed, further instruct the processor to:
- compare the ranking value of the second terminal with the ranking value of the first terminal; and
- transmit a message to the second terminal, if the ranking value of the second terminal is higher than the ranking value of the first terminal or if the second terminal is an intended recipient of the message.

15. The first terminal according to claim 13, wherein the instructions, when executed, further instruct the processor to obtain a measure of correlation between the social network and the communication network, and to weight a contribution of the ranking value of the second terminal to the ranking value of the first terminal with said correlation, said contribution being higher when said correlation is stronger.

16. The first terminal according to claim 13, wherein the network is an opportunistic network, wherein end-to-end connectivity between devices is performed using multi-hop data transfer over intermediate devices when they are temporarily connected.

17. The first terminal according to claim 13, wherein the ranking value of the first terminal compared with the ranking value of the second terminal is the updated ranking value of the first terminal.

18. The first terminal according to claim 13, wherein the instructions, when executed, further instruct the processor to:
- initialize the ranking value of the first terminal with zero before establishing said connection for a first time.

19. The first terminal according to claim 13, wherein the instructions, when executed, further instruct the processor to:
- transmit a number indicative of a set of social networking contacts of the first terminal;
- receive a number indicative of a set of social networking contacts of the second terminal;
- weight a contribution of the ranking value of the second terminal to the ranking value of the first terminal with said number indicative of said set of social networking contacts, said contribution being lower when said number is higher.

20. The first terminal according to claim 13, wherein the instructions, when executed, further instruct the processor to:
- update a number of connections between the first terminal and the second terminal in the communication network;
- update the ranking value of the first terminal based on said number of connections by weighting a contribution of the ranking value of the second terminal to the ranking value of the first terminal depending on said number of connections, said contribution being higher when said number is higher.

* * * * *